United States Patent [19]

Radzavich et al.

[11] Patent Number: 4,743,462

[45] Date of Patent: May 10, 1988

[54] METHOD FOR PREVENTING CLOSURE OF COOLING HOLES IN HOLLOW, AIR COOLED TURBINE ENGINE COMPONENTS DURING APPLICATION OF A PLASMA SPRAY COATING

[75] Inventors: Thomas J. Radzavich, Higganum; Donald G. Nordstrom, Meriden; Keith D. Sheffler, Wethersfield, all of Conn.

[73] Assignee: United Technologies Corporation, Hartford, Conn.

[21] Appl. No.: 885,556

[22] Filed: Jul. 14, 1986

[51] Int. Cl.$^4$ .............................................. B05D 3/08
[52] U.S. Cl. .................................... 427/34; 427/282; 427/300; 427/423
[58] Field of Search .................. 427/34, 423, 282, 300

[56] References Cited

U.S. PATENT DOCUMENTS

| | | | |
|---|---|---|---|
| 1,647,090 | 10/1927 | Globus . | |
| 2,324,568 | 7/1943 | Duggan | 91/65 |
| 2,363,660 | 11/1944 | Duggan | 91/65 |
| 2,583,533 | 1/1952 | Hiensch | 22/196 |
| 3,196,043 | 7/1965 | Harris et al. | 117/212 |
| 3,565,664 | 2/1971 | Al | 117/18 |
| 3,667,988 | 6/1972 | Horiki | 427/282 |
| 3,695,340 | 10/1972 | Gross | 164/246 |
| 3,972,974 | 8/1976 | Pico | 264/267 |
| 4,115,507 | 9/1978 | Pico et al. | 264/267 |
| 4,264,647 | 4/1981 | Trevorrow | 427/125 |
| 4,396,503 | 8/1983 | Schmidt | 209/393 |
| 4,402,992 | 9/1983 | Liebert | 427/34 |
| 4,518,635 | 5/1985 | Schnedecker et al. | 427/332 |
| 4,530,861 | 7/1985 | Sippel et al. | 427/282 |

Primary Examiner—John H. Newsome
Attorney, Agent, or Firm—James M. Rashid

[57] ABSTRACT

This invention relates to the application of plasma sprayed coatings to the surface of components which have small holes therein, such as hollow, air cooled blades or vanes used in turbine engines. Coating material is prevented from depositing on the wall surface of the holes by the presence of fugitive plugs in the holes during the coating process. The plugs are removed after the coating has been applied, resulting in the holes being open and unobstructed.

14 Claims, 1 Drawing Sheet

METHOD FOR PREVENTING CLOSURE OF COOLING HOLES IN HOLLOW, AIR COOLED TURBINE ENGINE COMPONENTS DURING APPLICATION OF A PLASMA SPRAY COATING

TECHNICAL FIELD

The present invention relates to the application of plasma sprayed coatings. More particularly, it relates to a method for preventing closure or plugging of cooling holes in hollow, air cooled turbine engine components such as blades or vanes during the application of plasma sprayed coatings onto the component surface.

BACKGROUND

The use of hollow, air cooled blades and vanes is common in modern gas turbine engines. During engine operation, air is flowed into an internal cavity of such components and is discharged through cooling holes present in the airfoil section and sometimes present in the platform and tip. The passage of air through the blade or vane (hereinafter referred to collectively as "blades") extracts heat from the blade surface, allowing use of the component even when the gas stream temperatures exceeds the melting temperature of the alloy from which the blade is made. Obstruction of the cooling holes can result in localized hot spots on the blade, which can cause cracking or localized melting of the blade; it can also cause degradation of a coating which may be present on the blade surface.

Coatings are applied to blades to provide enhanced resistance to oxidation, corrosion, erosion, and other such types of environmental degradation. See, e.g., U.S. Pat. Nos. 4,248,940 to Goward et al and 4,585,481 to Gupta et al, both of which are incorporated by reference.

In the plasma spray coating process, powders are injected into a high temperature, high velocity stream of ionized gases. At the point where the powders are injected into the gas stream, the temperature can be about 15,000° F. As a result, the powders are typically molten when they strike the substrate surface.

It has been observed that when coatings are plasma sprayed onto air cooled blades, the cooling holes can become filled with coating material, requiring a subsequent machining operation to reopen the holes. This is not only time consuming and therefore expensive, but locating the exact position of each hole is difficult.

One method which attempts to prevent the closure of cooling holes during a plasma spray operation is described in U.S. Pat. No. 4,402,992 to Liebert. In this patent, a high pressure stream of gas is flowed into the internal cavity of the blade during the coating operation; the gas is discharged through the cooling holes and is said to deflect the incoming coating particles away from the holes, thereby keeping the holes open. However, unless the gas is discharged evenly through each of the holes, some holes are still likely to become plugged. Furthermore, as the gas is discharged through each hole, it may cause turbulence adjacent to the surface of the blade, which could interfere with the application of a coating having a uniform thickness. Accordingly, engineers have sought improved methods for keeping the cooling holes open during the high temperature plasma spray coating process.

SUMMARY OF THE INVENTION

According to the invention, fugitive plugs are inserted into the cooling holes of hollow, air cooled blades prior to the plasma spray coating operation. The plugs are ablative in the plasma spray stream, and a portion of the head of each plug volatilizes during the spray operation which precludes any coating particles from securely bonding to the head. Furthermore, while some coating particles may become bonded to the plug heads, the bond is weak, and these particles are easily eroded away when struck by other coating particles in the plasma spray stream.

The plugs are sized to provide a sufficient amount of material which can be sacrificed during the spray operation so that at the end of the operation, the plug heads continue to protrude above the surface of the coating. Then, the plugs are removed from the coated component, by, e.g., heating the component at elevated temperatures for a time sufficient to cause complete volatilization, to open up the holes.

For the purposes of this specification and claims, the term "plasma spray" is meant to include thermal spray, detonation gun spray, vacuum spray, and other similar methods for applying overlay coatings.

In the preferred embodiment of the invention, the component being coated is a hollow, air cooled blade or vane having a plurality of cooling holes. The term "cooling hole" is meant to define a passage which extends from the gas path surface of a hollow blade or vane to an internal cavity. See, e.g., U.S. Pat. No. 4,474,532 to Pazder, which is incorporated by reference.

After the heating step which removes the plug from the cooling hole, the coated blade is preferably surface finished to polish the coating surface. This finishing step also removes any loosely adherent coating particles from the coating surface, especially any which are adjacent to the cooling hole.

BEST MODE FOR CARRYING OUT THE INVENTION

This invention is described in terms of the plasma spray deposition of an overlay coating onto an air cooled blade or vane used in a gas turbine engine. However, the invention is also useful in the application of overlay type coatings to other components having small perforations which may be prone to closure during the coating process. Such components may include, e.g., airseal segments and combustor segments.

Figure 1:
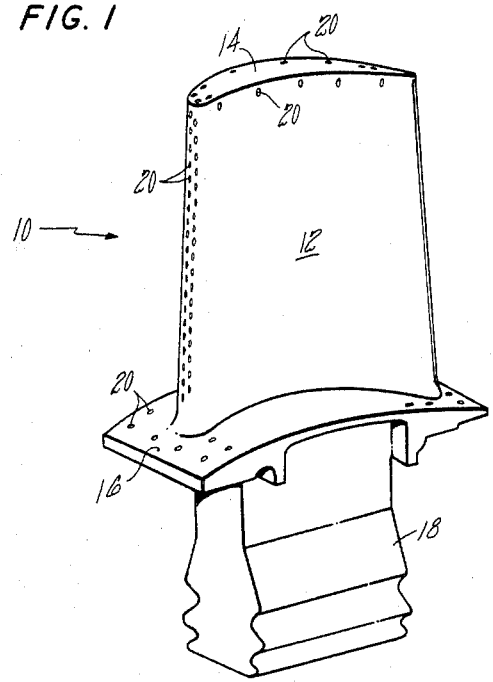
FIG. 1 is a perspective view of a blade used in a modern gas turbine engine.
Figure 2:
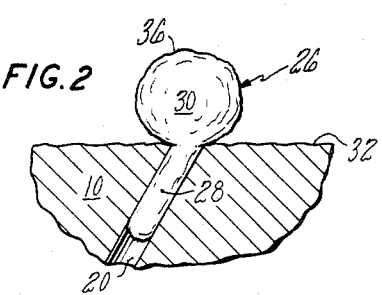
FIGS. 2-5 are greatly enlarged schematic views, in cross section, showing application of a thermal sprayed coating according to the teachings of the invention.

FIG. 1 is a view of a blade 10 having an airfoil section 12, a tip section 14, a platform section 16 and a root section 18. While a turbine engine vane has somewhat different features than that shown in the blade of FIG. 1, the term "blade" is meant to mean a blade as well as a vane. The blade 10 has cooling holes 20 which are present in the airfoil 12, tip 14, and platform 16. The number, size, and location of these cooling holes 20 is dictated by the particular operating characteristics of the blade and engine; the number, size and location of the holes 20 as shown in FIG. 1 is meant to be illustrative of the use of the invention and is not intended as limiting the scope of the invention.

Maintaining the cooling holes 20 in an unobstructed condition, as well as keeping the size and shape of the holes 20 within design limits is essential to achieve optimum performance of the blade 10 during engine operation. Coatings which are applied to the blade 10 can affect the condition of the cooling holes; as a result, the application of such coatings is a critical step in the overall blade fabrication process. As is discussed in the Background section, a common practice is to drill the holes after the coating is applied. Sometimes, the holes are welded shut before the coating is applied, and then redrilled after the coating process. All such techniques are expensive and time-consuming; therefore, improved techniques are desired.

According to the invention, coating material is prevented from solidifying in the cooling holes 20 (i.e., on the cooling hole wall surfaces) of an air cooled blade 10 by the presence of a fugitive plug 26 in the holes 20 during the plasma spray operation. (See FIGS. 1-5). Coating powder particles 38 which are melted in the plasma spray stream and which solidify on the head 30 of the plug 26 are poorly bonded to the head, and are eroded therefrom during the course of the spray operation. The plugs 26 are sacrificially ablative; the plug head 30 partially volatilizes during the spray operation which prevents the coating particles 38 from securely bonding to the head 30.

More specifically, FIGS. 2-5 show in schematic progression the manner in which a cooling hole 20 is kept substantially free of coating material during the high temperature coating process. A plug 26 which has a body 28 and a head 30 is disposed in the hole 20. In the Figures, the axis of the hole 20 is shown as being inclined relative to the surface 32 of the blade 10, although this is not necessary for the successful practice of the invention.

The diameter of the plug body 28 closely approximates the diameter of the hole 20, and as a result, the plug 26 fits snugly into the hole 20. The head 30 of the plug 26 is substantially larger (in terms of diameter) than the body 28 of the plug 26, and the head 30 abuts the blade surface 32. The head 30 is also sized so that it projects outwardly away from the blade surface 32 a distance greater than the thickness of the coating to be applied. Preferably, for spherically shaped heads 30, the head diameter is at least about twice as great as the final desired coating thickness. The head 30 is oversized relative to the desired coating thickness to insure that at the completion of the coating operation, each head 30 protrudes above the surface 35 of the coating 34, even though some of the head 30 volatilizes during the coating process.

Figure 3:
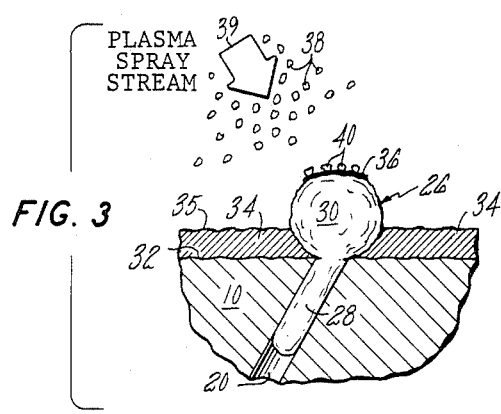

Referring to FIG. 3, powder particles 38 are carried towards the blade surface 32 in a high temperature, high velocity plasma spray stream 39. When the heated powder particles 38 impact and solidify on the surface 36 of the plug head 30, they are poorly bonded thereto. (The poor bond is indicated schematically by the heavy black line at the surface 36 of the head 30.) As a result of this poor bond, subsequent impacts of the molten powder particles 38 with these poorly bonded solidified particles 40 erodes the solidified particles 40 from the surface 36 of the head 30. Thus, the head surface 36 is kept substantially free of adherent, well bonded coating particles. In contrast, coating particles 38 which impact and solidify on the surface 32 of the blade 10 are securely bonded thereto. This secure bond is due, in significant part, to a pre-coating cleaning operation, which roughens the surface 32 of the blade 10. The rough surface 32 can also be formed by a bond coating such as described in the aforementioned U.S. Pat. No. 4,248,940 to Goward et al. The rough surface 32 (whether it be the blade surface or an intermediate coating surface) is important to the formation of a high integrity coating 34. The surface 36 of the plug head 30, however, is relatively smooth, which precludes the formation of a secure bond between the particles 40 and the plug head surface 36. Furthermore, the plug 26 is resilient, and some of the particles 38 bounce off of the head 30 when they strike it.

The poor bond between the particles 40 and the plug 26 is also due to the fact that the plug 26 is volatilizable at a temperature less than the temperature of the plasma spray stream, and the stream volatilizes a portion of the head 30 during the spray process. Thus, the head 30 is sacrificial, acting as an ablative surface in the high temperature plasma spray stream.

Figure 4:
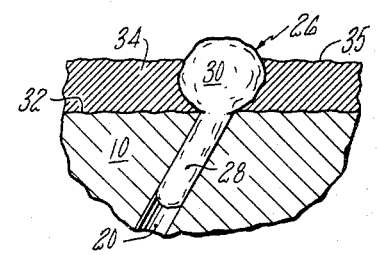

FIG. 4 shows a cross sectional view of the blade 10 at the completion of the coating process. The loss of material from the plug head 30 (due to volatilization) is apparent, but so is the absence of coating material 34 in the cooling hole 20. The plug head 30 protrudes above the surface 35 of the coating 34. After the completion of the coating process, the blade 10 is heated at a temperature which causes complete volatilization of the plug 26, which opens up the cooling hole 20. (The plugs 26 may also be removed chemically). When the plug 26 volatilizes, any powder particles which are still bonded to the surface 36 of the plug head 30 will, of course, be lost from the surface of the blade 10. Even if some of the coating 34 bridges over the head 30 of any of the plugs 26, this coating is readily removed by a subsequent surface finishing process which smooths the surface of the coating.

Figure 5:
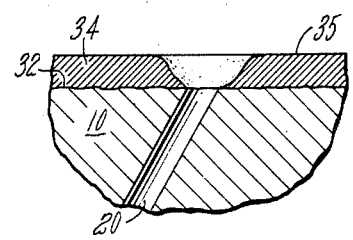

Smooth surface coatings are desired for aerodynamic purposes, and the blade 10 is preferably surface finished by, e.g., mass media polishing, after the plugs 26 are removed. Other types of polishing operations to smooth the coating surface may be used with equal success. FIG. 5 shows that after the surface finishing process, the entrance to the cooling hole 20 is unobstructed, and the coating 34 is smooth.

The invention may be better understood by reference to the following examples, which are meant to be illustrative rather than limiting.

EXAMPLE I

A nickel base superalloy gas turbine engine blade having approximately 100 cooling holes in the airfoil surface was coated according to the invention. The diameter of each cooling hole was about 0.015 inches, and the holes were generally about 0.100 inches apart. The axis of each hole was inclined relative to the surface, similar to the inclination shown in FIGS. 2-5.

A two layer coating similar to the coating described in the aforementioned U.S. Pat. No. 4,248,940 was applied to the blade airfoil surface. The first layer was a metallic MCrAlY coating, and the second layer was an oxide stabilized ceramic thermal barrier coating. The MCrAlY coating provides oxidation resistance to the blade, and is also a bondcoat for the ceramic coating. Prior to application of the bondcoat, the blade surface was cleaned in an abrasive blasting operation; 240 grit $Al_2O_3$ was the abrasive grit used. The cleaned blade was coated in a low pressure chamber spray process with about 0.004 to 0.007 inches of MCrAlY coating. The blade was oriented relative to the plasma spray stream in the manner shown in FIG. 3, i.e., so that the axes of the holes were, in general, not aligned with the axis of the spray stream. The as-sprayed MCrAlY coating had a surface finish which was similar to that produced on the blade surface by the pre-coating abrasive blasting operation; i.e., the bond coat surface was rough.

Following the application of the MCrAlY bond coat, fugitive plugs were disposed in those cooling holes which were known to be prone to plugging during the application of a ceramic thermal barrier coating. The plugs were fabricated from nylon filaments whose diameter approximated the diameter of the cooling holes. The filaments were cut into lengths which approximated the wall thickness of the blade; the head on each plug was formed by melting the end of the filament in a flame which caused the molten mass to coalesce into a relatively smooth, spherically shaped head.

As noted above, for spherically shaped plug heads, the head diameter is at least about twice as great as the final coating thickness, and preferably, at least three times greater. As a rule, the head should be large enough so that even though the plug is partially ablated (sacrificed) during the spray operation, the head still protrudes above the surface of the coating at the completion of the coating operation.

While spherically shaped plug heads are preferred, other shapes may also be utilized. Such shapes could be fabricated by, e.g., injection molding techniques. Also, while the plugs in this Example were nylon, other materials which are volatilizable in the plasma stream may be equally useful, as long as they do not react with the coating material or the substrate being coated.

After the MCrAlY coating was applied to the blade, the plugs were inserted into the cooling holes. A thin coating of an organic adhesive was applied onto the body of each plug to insure that the plug remained in its respective hole. Then, a 0.008 to 0.014 inch thick coating of yttria stabilized zirconia was applied by an air plasma spray process; again, the blade was oriented so that the plasma spray stream and the cooling hole axes were not aligned, as shown in FIG. 3. At the completion of the coating operation, the heads of the plugs were visible, i.e., they protruded above the surface of the coating. The blade was then heat treated at about 1,000° F. for one hour to volatilize the plugs, and then mass media polished to smooth the surface of the ceramic coating. During the polishing step, any loosely adherent coating adjacent to the hole was also removed, resulting in a smooth coating surface similar to that shown in FIG. 5. (The MCrAlY coating is not shown in this Figure.)

In order to prevent complete volatilization of the plugs during the deposition of the ceramic coating, the spray parameters need to be closely controlled; dwell time and gun distance are the parameters of most concern. Coatings have been successfully applied according to the invention using a Model SG-100 plasma spray gun made by Plasmadyne, Santa Anna, Calif., USA, using the spray schedule shown in Table I.

EXAMPLE II

Air cooled, service operated turbine blades which had a dual layer MCrAlY + ceramic coating were refurbished using the techniques of the invention. The ceramic coating was removed in a grit blast operation, and the MCrAlY coating chemically stripped in a muriatic acid stripping solution. Then the blade was abrasive blasted with 240 grit $Al_2O_3$. A 0.004–0.007 inch MCrAlY coating was applied in a low pressure chamber spray process, while the blade was maintained at a temperature of about 1,400° F. Nylon plugs, fabricated as described above, were inserted into each cooling hole after the application of the MCrAlY coating and then a 0.008–0.014 inch $Y_2O_3$–$ZrO_2$ ceramic coating then applied over the MCrAlY coating according to the parameters of Table I. The blade was heated to 1,000° F. for one hour to volatilize the plugs, then diffusion heat treated at 1,975° F. for four hours. Surface finishing by mass media polishing produced a coated blade having a smooth aerodynamic surface.

In the preferred embodiment, the component is sprayed with a two layer coating comprising a first metallic MCrAlY type layer and a second ceramic oxide stabilized zirconia layer. The plugs are used only during the application of the ceramic layer. The scope of the invention is not limited to such two layer coatings, nor to the use of the plugs only during the application of the ceramic coating. The invention has utility in any application in which a plasma sprayed coating is deposited onto an air cooled component such as a turbine blade or vane, or onto a perforated component such as an outer air seal or combustor panel. Such plasma spray coatings include, but are not limited to, simple metallic compositions such as NiCr, NiAl or MCrAl (where M is selected from the group consisting of nickel, iron, cobalt, or mixtures thereof); simple ceramic compositions such as $Al_2O_3$, $ZrO_2$ or $CaTiO_3$; complex metal-ceramic compositions such as NiCr-$Cr_3C_2$ or WC; complex metallic compositions such as MCrAlY or NiCoCrAlY+Hf+Si; and complex ceramic compositions such as CeO-$ZrO_2$.

Although this invention has been shown and described with respect to a preferred embodiment, it will be understood by those skilled in the art that various changes in form and detail thereof may be made without departing from the spirit and scope of the claimed invention.

TABLE I

| Ceramic Coating Spray Parameters | |
| --- | --- |
| Gun to blade distance | 3 inches |
| Gun Traverse speed | 3 inches per second |
| Powder Feed Rate | 50–55 grams per minute |
| Dwell time between passes of spray stream | 30 seconds |
| Amperage/voltage | 800 amps/40 volts |

We claim:

1. A method for applying a desired thickness of an overlay coating to the surface of a component having a plurality of small, spaced apart perforations in said surface, comprising the steps of:
   (a) disposing in each perforation a fugitive plug which is volatilizable at a temperature less than the temperature of the coating process, wherein each plug has a head portion which is enlarged relative to the diameter of its respective hole and which abuts the component surface and which projects above the surface a distance greater than at least twice the desired coating thickness;
   (b) applying the desired thickness of the overlay coating to the component surface, wherein the heat of the coating process causes only a portion of the head of each plug to volatilize, which volatilization interferes with the deposition of the coating on each plug head, and wherein the head of each plug protrudes above the surface of the coating at the completion of the coating process; and (c) completely removing the plugs from the component at the completion of the coating process, wherein the perforations are thereby opened and substantially free of coating.

2. A method for applying a plasma sprayed coating to a hollow blade having a cooling hole therein, comprising the steps of:

(a) treating the blade to clean and roughen the blade surface;

(b) disposing in the cooling hole a plug which volatilizes at a temperature less than the temperature of the plasma spray stream, wherein the plug has a body portion which fits snugly into the cooling hole, and a head portion which is enlarged relative to the diameter of the cooling hole and which abuts the blade surface;

(c) spraying heated powder particles in a high temperature plasma spray stream onto the blade surface, wherein particles which impact and solidify on the rough blade surface are securely bonded thereto, and particles which impact and solidify on the plug head surface are poorly bonded thereto and subsequent impacts of the heated powder particles with said poorly bonded particles erodes said particles from the plug head surface whereby said surface is kept substantially free from solidified particles, and wherein the plasma spray stream volatilizes a portion of the plug head thereby further keeping said head substantially free from solidified particles, said head protruding above the surface of the coating at the completion of said spraying step; and (d) treating the coated blade to cause complete removal of the plug, wherein the hole is substantially free from solidified powder particles.

3. The method of claim 2, wherein the plug head surface is substantially smoother than the blade surface.

4. The method of claim 3, wherein ceramic powder particles are sprayed in a plasma spray stream.

5. The method of claim 4, further comprising the step of diffusion heat treating the coated blade and then surface finishing the blade to remove any poorly bonded ceramic particles therefrom and to produce thereon a smooth surface.

6. A method for the repair of a hollow, air cooled, previously coated gas turbine blade after service operation, wherein the blade has a plurality of cooling holes therein, the method comprising the steps of:

(a) removing the coating from the blade;

(b) treating the blade to clean and roughen the blade surface;

(c) vacuum plasma spraying a bond coating onto the blade surface in a high temperature plasma spray stream, the blade maintained at a temperature of at least about 1,400° F. during said spraying step, the surface of the bond coating being rough;

(d) disposing in the cooling holes a plug volatilizable at a temperature less than the temperature of the plasma spray stream, wherein the plug has a body portion which fits snugly into its respective cooling hole and a head portion which is enlarged relative to the diameter of its respective cooling hole and which abuts the blade surface, wherein the surface of each plug head is substantially smoother than the surface of the bondcoat;

(e) plasma spraying thermal barrier powder particles onto the rough bond coating, wherein particles which impact and solidify on the bond coating are securely bonded thereto, and particles which impact and solidify on the head surface of each plug are poorly bonded thereto and subsequent impacts of said powder particles with said poorly bonded particles erodes said particles from the plug head surface whereby said surface is kept substantially free from solidified powder particles, and wherein the plasma spray stream volatilizes a portion of the plug head thereby further keeping said head substantially free from solidified powder particles, the plug heads protruding above the surface of the ceramic coating after said spraying step;

(f) heating the coated blade to cause complete volatilization of the plugs, wherein the cooling holes are opened; and (g) surface finishing the blade to remove any poorly bonded thermal barrier powder particles and to smooth the thermal barrier coating layer.

7. The method of claim 6, wherein the bondcoat is an MCrAlY type overlay.

8. The method of claim 7, wherein the thermal barrier coating is a ceramic.

9. The method of claim 6, wherein the thickness of the bondcoat on the blade surface is about 0.004 to 0.007 inches.

10. The method of claim 9, wherein the thickness of the thermal barrier coating is about 0.008 to 0.015 inches.

11. The method of claim 10, wherein the cooling hole diameter is about 0.010 to 0.030 inches.

12. A method for applying a plasma sprayed coating onto the surface of a hollow turbine engine blade having cooling holes therein which extend from the blade surface to an internal blade cavity, comprising the the steps of:

(a) disposing a plug having a head portion and a body portion onto the cooling holes, the body portion of each plug sized to fit snugly into its respective cooling hole and the head portion of each plug enlarged relative to the diameter of its respective hole, the head portion abutting the surface of the blade, wherein the plugs have a volatiization temperature;

(b) plasma spraying the coating onto the blade surface at a spray temperature greater than the plug volatilization temperature, wherein the plug heads are sized so that the heads extend above the coating surface and abut the blade surface at the completion of said spraying step; and (c) heating the coated blade to volatilize the plug and remove them from their respective cooling hole.

13. The method of claim 12, further comprising the step of treating the coated blade to smooth the surface of the coating.

14. The method of claim 12, wherein the coating is a ceramic coating.

* * * * *